United States Patent [19]

Curry

[11] Patent Number: 5,602,653
[45] Date of Patent: Feb. 11, 1997

[54] PIXEL PAIR GRID HALFTONING FOR A HYPERACUITY PRINTER

[75] Inventor: Douglas N. Curry, Menlo Park, Calif.

[73] Assignee: Xerox Corporation, Stamford, Conn.

[21] Appl. No.: 335,622

[22] Filed: Nov. 8, 1994

[51] Int. Cl.$^6$ ........................................ H04N 1/40
[52] U.S. Cl. ..................... 358/454; 358/455; 358/458; 358/460; 358/463
[58] Field of Search ................................... 358/454, 455, 358/458, 460, 463, 456; 382/237, 275

[56] References Cited

U.S. PATENT DOCUMENTS

| | | | |
|---|---|---|---|
| 4,336,558 | 6/1982 | Lew | 358/456 |
| 4,430,748 | 2/1984 | Tuhro et al. | 382/50 |
| 4,868,587 | 9/1989 | Loce et al. | 346/157 |
| 4,918,543 | 4/1990 | Petilli | 358/465 |
| 4,920,501 | 4/1990 | Sullivan et al. | 358/463 |
| 4,965,679 | 10/1990 | Morton et al. | 358/455 |
| 5,041,920 | 8/1991 | Hayes et al. | 358/455 |
| 5,200,841 | 4/1993 | Kotaki et al. | 358/455 |
| 5,225,915 | 7/1993 | Ciccone et al. | 358/454 |
| 5,226,096 | 7/1993 | Fan | 382/50 |
| 5,243,443 | 9/1993 | Eschbach | 358/455 |
| 5,257,116 | 10/1993 | Suzuki | 358/465 |
| 5,268,774 | 12/1993 | Eschbach | 358/466 |
| 5,271,070 | 12/1993 | Truong et al. | 382/50 |
| 5,278,678 | 1/1994 | Harrington | 358/518 |
| 5,301,039 | 4/1994 | Tanioka | 358/455 |
| 5,321,525 | 6/1994 | Hains | 358/458 |
| 5,422,740 | 6/1995 | Fujimoto et al. | 358/456 |

*Primary Examiner*—Edward L. Coles, Sr.
*Assistant Examiner*—Thomas L. Stoll
*Attorney, Agent, or Firm*—Fay, Sharpe, Beall, Fagan, Minnich & McKee

[57] ABSTRACT

Image data (10) is represented by a plurality of scan lines (30). Each scan line (30) includes a line of pixels (32) along a fast scan access. Each pixel (32) represents an optical density for a specific location in the image data (10). Pairs of pixels in the fast scan direction of odd numbered scan lines (30) are grouped in even/odd pixel pairs by logic circuit (12). Pairs of pixels of even numbered scan lines (3) are grouped in odd/even pixel pairs such that the groupings in adjacent lines are offset. Each pixel pair contains n addressability units defining a halftone cell. The addressability units of the pixel pair are combined. A propagated error value from a previous pixel pair and the data values of each pixel pair are combined and used to address a memory location in a look-up table (14). The memory location contains a corresponding binary data value representing an intensity level for each pixel of the pixel pair. The binary data is outputted to a gray modulator (16) to be printed by a printer (18). The outputted data grid is equivalent to a very high frequency halftone screen having a Moiré pattern not visually perceivable.

5 Claims, 1 Drawing Sheet

PIXEL PAIR GRID HALFTONING FOR A HYPERACUITY PRINTER

BACKGROUND OF THE INVENTION

Digital halftoning, sometimes referred to as "spatial dithering", is the process of creating a binary approximation to a sampled gray scale image. Sampled gray scale values are typically quantized to have one of a discrete number of values, e.g., 256 or 1024 values. The basic idea in digital halftoning is to replace these quantized picture elements (pixels) from a region of the gray scale image having an average value of x (where 0=white and 1=black) with a binary pattern of 1s and 0s. Halftoning works because the eye perceives a set of closely spaced black and white spots as a shade of gray. Alternately, it may be said that the eye acts as if it contains a spatial low pass filter.

In accordance with one halftoning technique, the fraction of resulting 1s is approximately x. The binary pattern is then conveniently used with a display device such as a CRT display or a printer to produce the values for the pixels in the gray scale halftone image. If the 1s and 0s are supplied to a printer where the 1s are printed as black spots and spaces are sufficiently close together, the eye averages the black spots and white spaces to perceive, approximately, gray level x. In so perceiving the image, the eye exhibits a low-pass filtering characteristic. The number of gray scale samples (pixels) is advantageously equal to the number of bits in the binary pattern.

Recent years have witnessed increasing demand for digital storage and transmission of gray scale images. In part, this is due to the increasing use of laser printers having a resolution of, e.g., 600 spots (dots) per inch, to produce halftone approximations to gray scale images such as photographs, art work, design renderings, magazine layouts, etc. The conventional approach to achieving high quality halftone images is to use a high resolution printer. However, the printer resolution required for transparent halftoning with prior art techniques is of the order of 1400 dots/inch. Such printers are often slow and expensive.

Many prior art halftoning techniques assume that the black area of a printed binary pattern is proportional to the fraction of 1s in the pattern. This means that the area occupied by each black dot is roughly the same as the area occupied by each white dot. Thus, the "ideal" shape for the black spots produced by a printer (in response to 1s) would be T×T squares, where T is the spacing between the centers of possible printer spots. However, most practical printers produce approximately circular spots. It is clear, therefore, that the radius of the dots must be at least $T/\sqrt{2}$ so that an all-1s binary pattern is capable of blackening a page entirely. This has the unfortunate consequence of making black spots cover portions of adjacent spaces, causing the perceived gray level to be darker than the fraction of 1s. Moreover, most printers produce black spots that are larger than the minimal size (this is sometimes called "ink spreading"), which further distorts the perceived gray level. The most commonly used digital halftoning techniques (for printing) protect against such ink spreading by clustering black spots so the percentage effect on perceived gray level is reduced. Unfortunately, such clustering constrains the spatial resolution (sharpness of edges) of the perceived images and increases the low-frequency artifacts. There is a tradeoff between the number of perceived gray levels and the visibility of low-frequency artifacts.

Block replacement is one commonly used halftoning technique used to improve perceived and gray scale images. Using this technique, the image is subdivided into blocks (e.g. 6×6 pixels) and each block is "replaced" by one of a predetermined set of binary patterns (having the same dimensions as the image blocks). Binary patterns corresponding to the entire image are then supplied to a printer or other display device. Typically, the binary patterns in the set have differing numbers of 1s, and the pattern whose fraction of 1s best matches the gray level of the image block is selected. This block replacement technique is also referred to as pulse-surface-area modulations.

In another halftoning technique known as screening, the gray scale array is compared, pixel by pixel, to an array of thresholds. A black dot is placed wherever the image gray level is greater than the corresponding threshold. In the so-called random dither variation of this technique, the thresholds are randomly generated. In another variation, ordered dither, the thresholds are periodic. More specifically, the threshold array is generated by periodically replicating a matrix (e.g. 6×6) of threshold values.

A technique known as error diffusion is used in non-printer halftone display contexts to provide halftoning when ink spreading and other distortions common to printers are not present. Like most of the known halftoning schemes, error diffusion makes implicit use of the eye model. It shapes the noise, i.e., the difference between the gray scale image and the halftone image, so that it is not visible by the eye. The error diffusion technique produces noise with most of the noise energy concentrated in the high frequencies, i.e., so-called blue noise. Thus, it minimizes the low-frequency artifacts. However, since error diffusion does not make explicit use of the eye model, it is not easy to adjust when the eye filter changes, for example with printer resolution, or viewer distance. Error diffusion accomplishes good resolution by spreading the dots. It is thus very sensitive to ink spreading, in contrast to the clustered dot schemes like "classical" screening. In the presence of ink spreading, error diffusion often produces very dark images, therefore limiting its application to cases with substantially no ink spreading.

Numerous researchers have estimated the spatial frequency sensitivity of the eye, often called the modulation transfer function (MTF). The eye is most sensitive to frequencies around 8 cycles/degree. Others have variously estimated the peak sensitivity to lie between 3 and 10 cycles/degree. The decrease in sensitivity at higher frequencies is generally ascribed to the optical characteristics of the eye (e.g. pupil size). The sensitivity of the eye drops 3 db from its peak at about 3 and 16 cycles/degree, 20 db at 35 cycles/degree, and about 46 db at 60 cycles/degree. The decrease in sensitivity at low frequencies accounts for the "illusion of simultaneous contrast" (a region with certain gray level appears darker when surrounded by a lighter gray level than when surrounded by a darker) and for the Moch band effect (when two regions with different gray levels meet at an edge, the eye perceives a light band on the light side of the edge and a dark band on the dark side of the edge).

The eye is more sensitive to horizontal or vertical sinusoidal patterns than to diagonal ones. Specifically, it is less sensitive to 45 degree sinusoids, with the difference being about 0.6 db at 10 cycles/degree and about 3 db at 30 cycles/degree. This is not considered to be large, but it is used to good effect in the most commonly used halftoning technique for printers.

Standard error diffusion techniques have several drawbacks. First, errors are propagated which are a significant fraction of a mark. When the diffused error is large, an unpleasing texture results. Second, weighted errors are computed and propagated to adjacent pixels in a slow scan direction. This in turn requires computationally intensive algorithms for clustering and adjusting marks.

SUMMARY OF THE INVENTION

In accordance with the present invention, a new halftoning technique is provided for hyperacuity printers. A source inputs image data which has a periodic function with a frequency that tends to create a Moiré pattern within the image data. The image data is converted by a converter into a binary data image. The converter includes a logic circuit which combines gray scale density values of at least two adjacent pixels to produce a pixel pair value. The adjacent pixels are adjacent in a fast scan direction of a scan line. A look up table is addressed by the pixel pair value to retrieve corresponding binary data values for the two adjacent pixels. The frequency creating the Moiré pattern is increased to a range where the Moiré pattern is not visually perceivable when the binary data image is displayed.

In accordance with a more limited aspect of the present invention, the converter adds a carryover error value which is propagated from a previous pixel pair to the pixel pair value. The error is only propagated in the fast scan direction. The carryover error value is outputted from the look-up table to the logic circuit.

In accordance with a more limited aspect of the present invention, edge slope information defining a slope of an edge approaching a current pixel, and space information defining a minimum inter-pixel mark space requirement for the current pixel are included in the image data and are used to access the look-up table.

One advantage of the present invention is that a high frequency halftone image is produced. Low frequency Moiré patterns are increased to a frequency level that is not visually perceivable once displayed. The displayed output data has a consistent and uniform intensity level across a page.

Another advantage of the present invention is that the apparatus and method drives a high addressability gray modulator resulting in an error having a smaller proportion to a mark and thus, is not required to be propagated in the slow scan direction. Pixels are added in even/odd pairs in the fast scan direction. Any resulting errors are propagated only in the fast scan direction to the next pixel pair.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
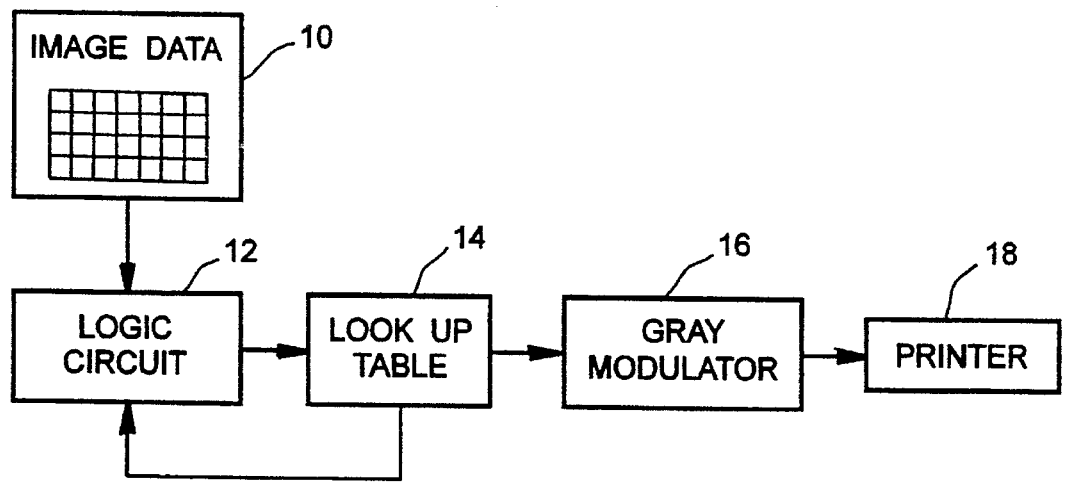
FIG. 1 is a block diagram of the present invention.

With reference to FIG. 1, an input image 10 to be processed is represented by a set of gray signals (gray pixels) arranged in an array of scan lines. Each scan line contains a plurality of gray pixels each defining an optical density level varying between a minimum and a maximum value. Each pixel is therefore defined by its optical density and position in the image. Gray values or levels for gray pixels are typically expressed as integers, with one example falling in the range from 0 to 255, although greater or lesser number of levels, as well as non-integer representations, are possible. An output image is considered to consist of pixels, each pixel corresponding to a printer signal that will drive a printer or display to produce a spot.

Pixel and slope information from the image data 10 enter the logic circuit 12. The pixels are grouped in adjacent pairs according to an internal grid parameter for each scan line. Values of each pixel pair are summed or averaged. A predetermined error propagated from a previous pixel pair along the same scan line is added to the total if such error exists. This total value is used as an address to access a look-up table 14. The look-up table 14 supplies a closest fit high addressability mark corresponding to a binary data value for each pixel of the current pixel pair. The binary data values are sent to a gray modulator 16 and corresponding halftone dots are outputted to printer 18.

The look-up table 14 feeds back a new error and space value to be propagated to the next pixel pair in the fast scan direction. An error occurs when the smallest space (white area) or a smallest mark (black area) which are defined for a target printer, are exceeded by the value of the averaged pixel pairs. For example, if there is a need to print a smaller area than the defined area for the target printer, the smallest defined area will be printed and the excess value will be propagated to the next pixel pair as an error. Thus, error is the difference between what was actually printed and the total sum of what is desired to have been printed. By including this error diffusion technique of propagating an error along only the fast scan direction, proper density over several dots is insured instead of for one dot.

Figure 2:
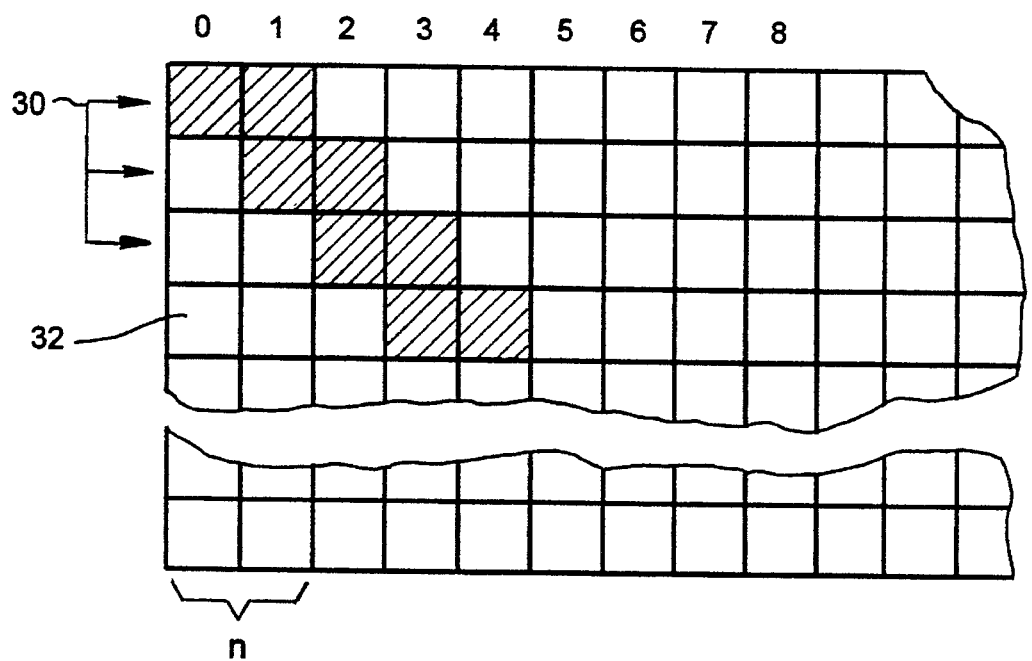
FIG. 2 is a diagram of image data represented by lines of pixels.

With reference to FIG. 2, the image data is represented by a plurality of scan lines 30. Each scan line is formed by a plurality of pixels 32. Exemplary grouped pixel pairs are represented by the shaded pixels. A halftone cell is defined as being n addressability units wide in the fast scan direction of a scan line. The halftone cell is defined by a width of a pixel pair. The halftone cell has a height of 1 pixel in the process direction. The n/2 addressability units in each pixel correspond to an optical density level of a portion of the image data represented by the pixel. Pixel values correspond to gray scale image data. For printing by a printer, the gray scale image data is converted to binary data. The look-up table 14 is used to effectuate the conversion in real time. The gray scale sum of each pixel pair along with any carryover error, form a memory address to access the look-up table 14. The table 14 is pre-programmed to retrieve a best fit binary data value for the n addressability units of the pixel pair and to carryover any round-off error or unused gray scale data for the next pixel pair. The carryover error results when the pixel pair gray scale sum cannot be fit evenly into the n addressability units which are each constrained to assume a 1 or a 0 value. The addressability unit values could be calculated on the fly, but such calculations would use several clock cycles. For greater speed, the addressability unit values are precalculated and stored in a look-up table that is addressable in a single clock cycle.

Marks are created by turning on a certain number of addressability units in the halftone cell corresponding to the averaged sum of the two pixels plus the error from the previous pixel pair. By sequentially turning on more and more addressability units, a higher and higher density is created for the halftone cell.

On subsequent scan lines, the pixels forming the pixel pairs are staggered by 1 each scan line. Thus in a first scan line, even/odd pixels are combined to form the pixel pairs and in a second scan line, odd/even pixels are combined to form pixel pairs. That is, the groups of n addressability units are shifted in each subsequent scan line by one pixel. By grouping pixels into pairs, twice as many addressability units are available for an improved gray scale fit and less carryover or round-off error. By staggering the pixel pairs along scan lines, an undulating grid is formed. The pixel grouping and grid staggering create the equivalent to a very high frequency halftone screen. Outputted binary data tends to contain a periodic function which has a frequency creating a Moiré pattern. This conversion technique decreases the carryover error, doubles the distance over which the carryover error and any periodic functions are spread, alters the periodicity of any periodic functions from line to line, and staggers the vertical coherency of any periodic functions from line to line. This increases the frequency of the Moiré pattern outside the band width perceivable by the human eye. Thus, the Moiré pattern is effectively eliminated. Of course, other numbers of pixels, e.g., 3, may be combined to obtain an increase of the Moiré frequency.

In another embodiment, a space parameter, a slope parameter, and a grid parameter, as are known in the art, are supplied along with the pixel pair sum and the error to the look-up table. The space parameter defines a minimum inter-dot spacing. In other words, it defines a minimum white area or space which is provided between a trailing edge of the previous pixel and a leading edge of the present pixel so that the minimum space requirements for the current pixel can be maintained. The slope parameter defines the slope of an edge that intersects a current pixel or is within three adjacent pixels of the current pixel. The grid value defines shifts or offset in the dot portions. By further utilizing slope information to promote clustering (where the slope is determined from four adjacent pixels forming a square) edges will be rendered exceptionally well due to the fine pitch of the dots.

The slope information indicates where an edge is supposed to exist. When an edge is present, the mark closest to the edge is adjusted such that it is tangential to the edge. The edge mark or dot is shifted in the fast scan direction, enlarged (or contracted), or a combination of the two. For a substantial vertical slope, the dot is shifted. For a flat slope, marks are grown from the center of the pixel to expand the edges outward. For slopes which ascend or descend at some high rate, the mark is grown from an appropriate fast scan direction edge to promote clustering and better edge positioning. For slow scan direction slopes, gray values are delivered by the corresponding addressability units which can move edges in the slow scan direction. Thus, the slope information input to the look-up table causes the corresponding dot size and position to be output. Constraining the size and position of a dot three or four pixels, i.e., seven or eight dots away, sets a boundary constraint on the inter-dot spacing of the intervening dots and potentially adjusts the carryover error. The space parameter constrains the maximum dot size for each pixel such that the minimum inter-dot spacing for the corresponding gray scale is maintained. The space parameter holds the value of the white area from the previous pixel pair. If the current pixel pair sum is not sufficient to maintain the white area, the space parameter adjusts the dot size and any shift in dot position imposed by an approaching or an immediate past edge in order to maintain the minimum distance between black dots.

The look-up table values are precalculated in accordance with the well-known prior art calculations. The inputs to the look-up table are preferably the sum of the gray scale values and the conventional slope, space, grid, and feedback errors in each category. The average of the gray scales could also be used. However, the sum increases the dynamic range of the look-up table, eliminates round off errors, and saves a calculation. Both dots of the pixel pair are output by the look-up table in accordance with the slope, gray scale, space, grid, and carryover error information.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An apparatus for processing image data and printing a corresponding image, the apparatus comprising:

a source of image data, said image data including a series of gray scale intensity values representing each pixel in a rectangular array of pixels, the image data having an inherent periodic function with a frequency which creates an unwanted Moiré pattern artifact of like frequency in said image data;

a logic circuit for combining gray scale density values of a group of at least two adjacent pixels to produce a combined pixel value, said adjacent pixels being adjacent along a scan line in a fast scan direction of the rectangular array;

a look-up table which is addressed by each of said combined pixel values to retrieve a corresponding data value for each group of pixels;

a printer which converts each data value to a mark of corresponding size such that the marks produce an image with local gray scale intensities which corresponds to the gray scale intensity values in corresponding areas of the image data;

the groups of pixels being offset from each other in adjacent scan lines such that the marks are offset in adjacent scan lines increasing the frequency of the Moiré pattern to a range in which the Moiré pattern in the image is less visible to the human eye.

2. The apparatus as set forth in claim 1 wherein said logic circuit includes:

an adder for adding a carryover error value from a previous combined pixel value to said combined pixel value and the look-up table outputting a carryover error to the logic circuit for addition to a subsequent combined pixel value.

3. In a method for processing electronic image data including image data values for each pixel of a plurality of scan lines, which image data has an inherent artifact frequency such that when the image data values are converted into marks by a printer to produce a human-readable image, the human-readable image contains Moiré artifacts of a frequency that is sufficiently low that the Moiré artifacts are visible to the human eye, the improvement comprising:

combining data values corresponding to groups of adjacent pixels in a fast scan direction of each scan line to derive a combined pixel value for each group, the groups of adjacent pixels in each scan line being offset from the groups of adjacent pixels in adjacent scan lines; and accessing a look-up table with each combined pixel value to retrieve a corresponding binary data value representing a gray scale density such that offsetting the combined pixel values in adjacent scan lines increases the inherent artifact frequency and the Moiré artifacts in the human-readable image become less visible to the human eye.

4. The method as set forth in claim 3 wherein said combining includes:

adding an error value derived from a previous combined pixel value to said combined pixel value.

5. A method of processing electronic image data including a multiplicity of image data values representing a gray scale intensity for a multiplicity of pixels of an image, the multiplicity of pixels being divided into a plurality of scan lines, the method comprising:

(a) averaging image data values corresponding to a plurality of adjacent pairs of pixels into a combined data value, including:

on a first scan line, averaging the image data values of even/odd pairs of adjacent pixels; and on a second scan line, averaging the image data values of odd/even pairs of adjacent pixels, whereby the combined data values of the first and second scan lines are staggered;

(b) addressing a look-up table with each combined data value to retrieve a corresponding print data value for the adjacent pixels;

(c) converting each print data value to a human-readable mark with a configuration corresponding to the gray scale intensity represented by the combined data value; and, (d) repeating steps (a)–(c) for the multiplicity of scan lines.

\* \* \* \* \*